United States Patent [19]

Mori

[11] Patent Number: 4,645,313

[45] Date of Patent: Feb. 24, 1987

[54] LIGHT RADIATING DEVICE

[76] Inventor: Kei Mori, 3-16-3-501, Kaminoge Setagaya-ku, Tokyo, Japan

[21] Appl. No.: 624,656

[22] Filed: Jun. 26, 1984

[30] Foreign Application Priority Data

Jul. 1, 1983 [JP] Japan ................................ 58-119867

[51] Int. Cl.$^4$ ............................................ G02B 26/08
[52] U.S. Cl. .................................................. 350/486
[58] Field of Search .............. 350/172, 173, 612, 613, 350/486, 171, 174, 96.1, 96.15, 259, 260, 601, 616, 626, 261, 262, 263, 264

[56] References Cited

U.S. PATENT DOCUMENTS

| | | | |
|---|---|---|---|
| 3,758,197 | 10/1973 | Klang et al. ......................... | 350/172 |
| 4,220,137 | 10/1980 | Tesch et al. ......................... | 350/613 |
| 4,383,729 | 5/1983 | Suzuki et al. ....................... | 350/174 |
| 4,402,575 | 10/1983 | Jacobs ................................ | 350/613 |

FOREIGN PATENT DOCUMENTS

| | | | |
|---|---|---|---|
| 0060902 | 5/1980 | Japan ................................. | 350/96.15 |
| 1148677 | 7/1965 | United Kingdom ................ | 350/259 |

*Primary Examiner*—John K. Corbin
*Assistant Examiner*—Vincent J. Lemmo
*Attorney, Agent, or Firm*—Jordan and Hamburg

[57] ABSTRACT

A light radiating device has a transparent cylindrical tube one end of which is connected by a light conducting cable or the like to a natural or artificial light source. A plurality of transparent plate and/or reflective plates are arranged in the tube to be rotatable respectively about independent axes which commonly extend perpendicular to the axis of the tube. When used for plant culture, for example, the plates are sequentially moved to reflect incoming light so that a plant growing in a position adjacent to the device is always illuminated from an optimum direction and under an optimum distribution of light. The axes of rotation of the plates extend in different directions from each other so as to radiate light over the entire circumference of the tube.

3 Claims, 9 Drawing Figures

LIGHT RADIATING DEVICE

BACKGROUND OF THE INVENTION

The present invention relates to a light radiating device for effectively diffusing light coming in through a light conducting cable or the like to the ambience.

To meet the increasing demand for energy saving, effective use of solar energy has been studied in various fields. For the most effective use of solar energy, it is the primary requisite that the solar energy be used as optical energy without being transformed into another kind of energy such as thermal energy or electrical energy. In light of this, the applicant has proposed in various forms a system in which solar radiation converged by lenses or the like is introduced into light conducting cables to propagate therethrough to desired locations and, then, diffused at the desired locations out of the cables. The system finds various applications as a light source such as for lighting rooms or causing photosynthesis for forced culture of plants.

Light advancing through a light conducting cable has directivity. Hence, concerning the application of the solar energy to lighting as stated above, the angular range available for the radiation of light is usually not larger than about 46 degrees when the light is discharged from a simply cut end of the light conducting cable. Such a narrow radiation range is incapable of lighting a room or the like in a desired manner. The applicant has made various propositions concerned with a light radiating device, or photoradiator, which effectively diffuses light propagating through a light conducting cable so as to radiate it over a desired range. The present invention is another successful implementation for such an attempt.

SUMMARY OF THE INVENTION

It is an object of the present invention to provide a light radiating device which effectively radiates solar rays or artificial rays transmitted by a light conducting cable to the ambience.

It is another object of the present invention to provide a light radiating device which is particularly suitable for use with an apparatus for plant culture.

It is another object of the present invention to provide a generally improved light radiating device.

In one aspect of the present invention, there is provided a light radiating device for radiating light transmitted thereto from a light source to the ambience, comprising a transparent cylindrical tube which is supplied with the light at one end thereof, and a plurality of transparent plates arranged along an axis of the tube to be rotatable respectively about axes which are independent of each other and perpendicular to the axis of the tube, each of the transparent plates reflecting a part of the light incident thereon when inclined with respect to the axis of the tube.

In another aspect of the present invention, there is provided a light radiating device for radiating light transmitted thereto from a light source to the ambience, comprising a transparent cylindrical tube which is supplied with the light at one end thereof, a plurality of transparent plates arranged along an axis of the tube to be rotatable respectively about axes which are independent of each other and perpendicular to the axis of the tube, and at least one reflective plate rotatable about an axis which is parallel to the axes of rotation of the transparent plates.

In another aspect of the present invention, there is provided a light radiating device for radiating light transmitted thereto from a light source to the ambience, comprising a transparent cylindrical tube which is supplied with the light at one end thereof, and a plurality of reflective plates arranged along an axis of the tube to be rotatable respectively about axes which are independent of each other and perpendicular to the axis of the tube.

The above and other objects, features and advantages of the present invention will become apparent from the following detailed description taken with the accompanying drawings.

DESCRIPTION OF THE PREFERRED EMBODIMENT

While the light radiating device of the present invention is susceptible of numerous physical embodiments, depending upon the environment and requirements of use, a substantial number of the herein shown and described embodiments have been made, tested and used, and all have performed in an eminently satisfactory manner.

Figure 1:
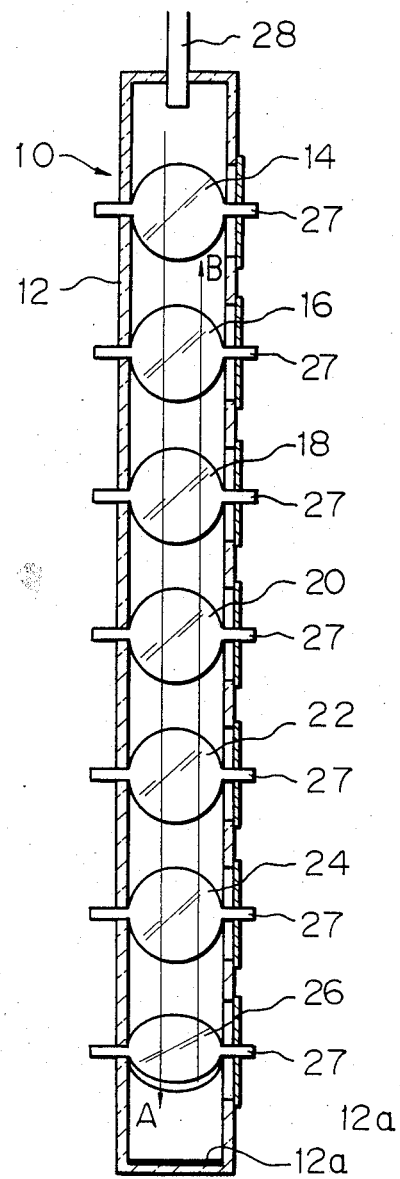
FIG. 1 is a partly sectional front elevation of a light radiating device embodying the present invention.
Figure 2:
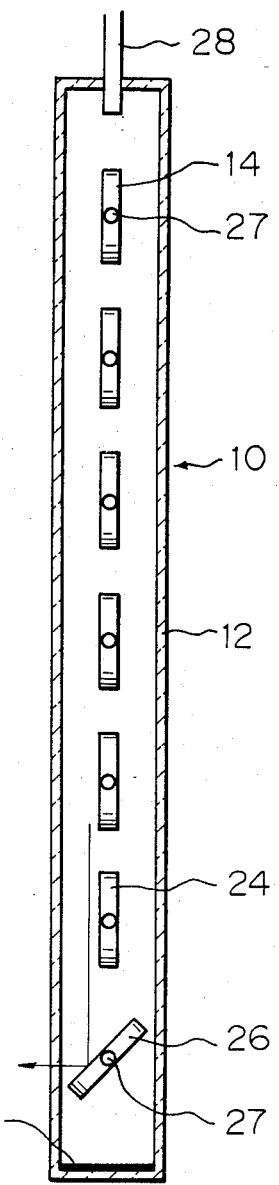
FIG. 2 is a partly sectional side elevation of the device as viewed in a position rotated 90 degrees about an axis thereof from the position shown in FIG. 1.

Referring to FIGS. 1 and 2 of the drawings, a light radiating device, or photoradiator as will be referred to, embodying the present invention is shown and generally designated by the reference numeral 10. The photoradiator 10 comprises a transparent cylindrical tube 12 and a plurality of transparent plates, such as seven as illustrated, which are arranged inside and along the axis of the tube 12. Each of the plates, 14, 16, 18, 20, 22, 24 and 26, is movable to any desired angular position about an axis which is perpendicular to the axis of the tube 10 and defined by radially opposite extensions 27 of the plate. The reference numeral 28 in FIGS. 1 and 2 designates a light conducting cable which transmits light, whether it be natural or artificial, to the photoradiator 10 of the present (invention.)

In the above construction, light introduced from the cable 28 into the photoradiator 10 propagates therethrough as indicated by an arrow A in FIG. 1 to be partly reflected by the first transparent plate 14. The reflected part of the incoming light is radiated through the tube 12 to the outside. The rest of the light, which is transmitted through the transparent plate 14, is partly reflected by the next transparent plate 16 while being partly transmitted therethrough. Such is repeated down to the transparent plate 26 remotest from the light inlet end of the photoradiator 10.

Since the transparent plates 14-26 are individually rotatable to any desired position about the extensions 27, it is possible to freely control the quantities of light reflected by the transparent plates 14-26 and, thereby, the distribution of light radiated from the photoradiator 10 along the axis of the same. When any of the transparent plates 14-26 are positioned parallel to the axis of the tube 12 as represented by the plates 14-24 by way of example, they allow the whole part of the incident light to advance as indicated by the arrow A in FIG. 1. When the transparent plates are inclined with respect to the axis of the tube 10 as represented by the plate 26, they individually reflect a part of the light to radiate it to the ambience. The quantity and direction of radiation of the light from the tube 12 effected by each transparent plate is determined by an angular position of the plate.

The photoradiator 10 of the present invention is effectively usable as, for example, a light source for photosynthesis in the forced culture of plants. In such an application, while a plant growing in the vicinity of the photoradiator is short, the transparent plates 14-24 may be positioned vertical and the lowermost transparent plate 26 inclined so as to cause the incoming light to be transmitted through the plates 14-26 and, then, reflected by the plate 26 to the outside of the tube 12, thereby illuminating the plant. As the plant grows taller and taller, the upper plates 14-24 may be sequentially tilted from the lowest one to the highest one. This enables the plant to be illuminated constantly from the above throughout its growth. Although a part of the light transmitted through any of the plates 14-26 advances toward another plate located therebeneath to be reflected thereby to the ambience, a major part of the entire incoming light is reflected by the upper plate. As a result, the quantity of light supplied to the plant is larger in an upper portion of the plant than in a lower portion, causing growth of the plant with the highest efficiency.

Figure 3:
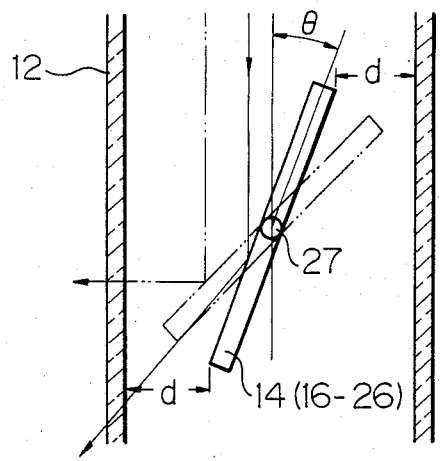
FIG. 3 is a view illustrative of a relationship between an angular position of a transparent plate included in the device of FIG. 1 and reflection of light.
Figure 4:
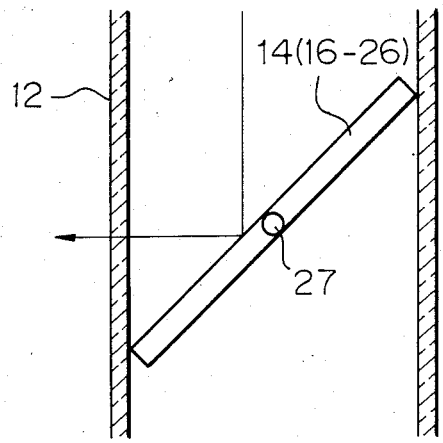
FIG. 4 is a view of a modified configuration of the transparent plate applicable to the device of the present invention.

A relationship between an angle of inclination $\theta$ of the transparent plates 14-26 with respect to the axis of the tube 12 and light reflected thereby is shown in FIG. 3. As previously described, when the angle $\theta$ is zero, almost all the incoming light advances downward through clearances d between the plate and the tube 12. With the increase in the angle $\theta$, the quantity of light incident on the plate is increased and the direction of reflection is shifted upwardly. When the angle $\theta$ is 45 degrees, the light is reflected substantially in the horizontal direction. While angles $\theta$ larger than 45 degrees cause the light reflected by the plate to be directed toward the plant from below, such inclinations are impractical because illuminating a plant from below is wasteful in plant culture.

Where each of the transparent plates 14-26 has a circular shape whose diameter is equal to the inside diameter of the tube 12, substantial clearances will still be left between the plate and the tube when the plate is inclined 45 degrees, allowing the light to advance downward. To reduce such a part of the light, each transparent plate may be shaped oval such that, as shown in FIG. 4, the clearances d become zero when the plate is inclined 45 degrees; such a configuration causes only the light transmitted through the plate to propagate further downward.

As shown in FIGS. 1 and 2, where radiation from the lower end of the tube 12 is needless, the inner surface of the tube lower end may be treated to function as a reflection surface 12a. Then, a part of the light reached the bottom of the tube 12 will be reflected by the reflection surface 12a to follow the path in the tube 12 backward as indicated by an arrow B (FIG. 1). In the course of the travel in the direction B, the light will be sequentially reflected by the backs of the inclined plates 14-26 in the opposite direction, thereby illuminating a plant which may be located adjacent to the back of the photoradiator 10.

The lowermost transparent plate, 26 in the illustrative embodiment, may be replaced with a plate which is reflective at both sides thereof. In such a case, the two-sided reflector plate may be provided with an oval configuration as previously discussed in order to reduce the clearances between the plate and the tube 12 and, thereby, allow a minimum of light to leak downward through the clearances, insuring effective utilization of the light entering the tube 12. The transparent plates and the reflector plate may be individually rotated to angular positions opposite to that illustrated with respect to the axis of the tube 12, so as to illuminate a plant located adjacent to the back of the photoradiator 10 as well.

Figure 6:
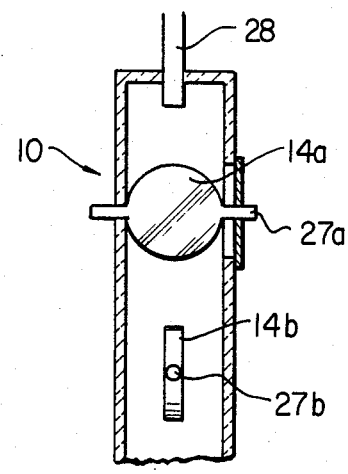
FIG. 6 is a partial sectional front elevation view of an alternate embodiment.

If desired, the transparent plates 14-26 may be arranged to rotate each about an axis which extend in a direction different from the others, such that light is radiated over the entire circumference of the photoradiator 10. For example, FIG. 6 shows the axes of the extensions 27a and 27b angularly offset relative to one another.

Further, half-mirrors or two-sided reflector plates or a combination thereof may be used in place of the transparent plates 14-26. Concerning two-sided reflector plates, their angle of inclination needs only be 45 degrees at the maximum and, therefore, their total angular range of rotation will be 90 degrees. In the case of combined use of two-sided reflector plates and transparent plates or half-mirrors, the reflector plates may alternate each with one or more transparent plates or half-mirrors. Then, when each of the reflector plates is inclined 45 degrees, it steers all the incoming light to the outside of the tube 12. Therefore, if the inclination of the reflector plate is progressively increased as the plant grows taller, the lowermost end of light radiated from the photoradiator 10 will be controlled to the growth of plants.

While all the transparent plates, half-mirrors and two-sided reflector plates have been shown and described as having flat configurations, it will be apparent to those skilled in this art that they may be formed arcuately to reflect light at their convex or concave surfaces.

Figure 5:
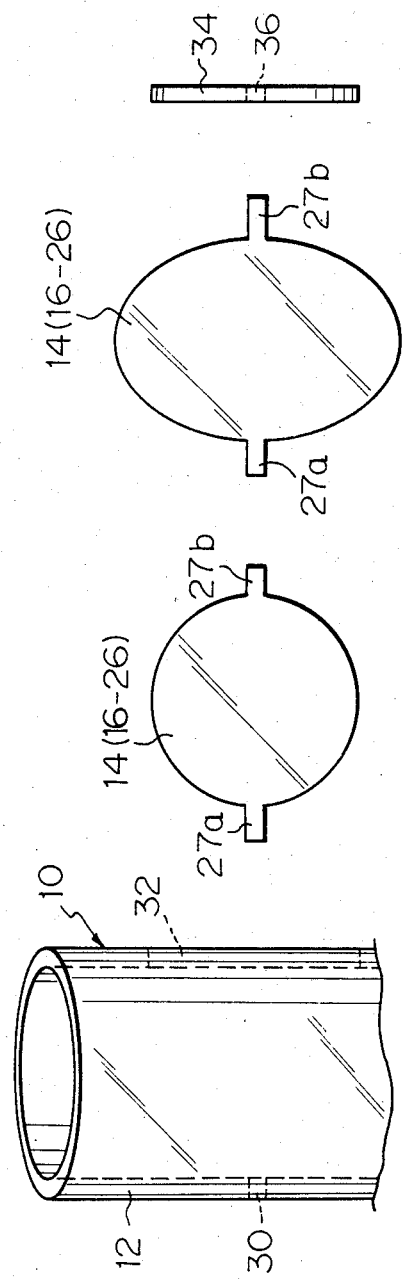
FIGS. 5(A)–5(D) show in exploded views an exemplary arrangement for positioning transparent plates or like plates in a cylindrical tube of the device of FIG. 1.

Referring to FIGS. 5A-5D, there is shown an exemplary arrangement for installing transparent plates, half-mirrors and/or two-sided reflector plates such as those shown and described in the tube 12. FIG. 5A is a fragmentary perspective view of the tube 12, FIG. 5B a front view of one of the circular transparent plates 14-26, FIG. 5C a front view of an oval reflector plate which may replace the transparent plate, and FIG. 5D a side view of a support piece which will be described. As shown, the tube 12 is formed with an opening 30 and a slot 32 which is radially opposite to the opening 30, while the transparent plates, half-mirrors or two-sided reflector plates 14-26 are commonly formed with radially opposite extensions 27a and 27b (identical with the extensions 27 in FIG. 1). The opening 30 of the tube 12 is adapted to receive one of the opposite extensions 27a and 27b of any of the plates 14–26. The slot 32, on the other hand, has a length and a width which are large enough to accommodate the plate; the length being larger than the length of the plate and the width being larger than the thickness of the plate. Needless to mention, the openings 30 and the slots 32 are each equal in number to the plates 14–26.

A manner of putting the plates 14–26 in operative positions inside the tube 12 will be described taking the plate 14 for example. The plate 14 is inserted into the tube 12 via the slot 32 with one of its extensions, extension 27a in FIGS. 5A–5D, oriented toward the opening 30. When the extension 27a has been engaged in the opening 30, the other extension 27b remains protruded outwardly from the slot 32. In this particular embodiment, a support piece 34 formed with an opening 36 is used to retain the extension 27b of the plate 14. After the extension 27b has been inserted in the opening 36 of the support piece 34, the support piece 34 is positioned such that the opening 36 is aligned with the opening 30 of the tube 12 and, then, the support piece 34 is rigidly connected to the outer periphery of the tube 12 by adhesive. Naturally, in the case where the plate 14 (16–26) has an arcuate cross-section, the slot 32 of the tube will also be shaped arcuately.

In summary, it will be seen that the present invention provides a light radiating device which is capable of illuminating any desired place therearound and radiating light by efficient diffusion.

Various modifications will become possible for those skilled in the art after receiving the teachings of the present disclosure without departing from the scope thereof.

What is claimed is:

1. A light transmitting device for radiating light transmitted thereto from a light source to the ambience comprising an elongate transparent cylindrical tube which is supplied with light at one longitudinal end thereof, said cylindrical tube having a longitudinal axis, a plurality of partially reflecting plates disposed within said cylindrical tube, rotatable support means on said cylindrical tube for rotatably supporting said plates about diametrical axes which are perpendicular to and which intersect the longitudinal axis of said cylindrical tube, each of said plates being rotatable to positions such that the general plane of each plate is disposed at an acute angle relative to the longitudinal axis of said cylindrical tube such that each of said plates reflects a part of the light incident thereon laterally of the longitudinal axis of the cylindrical tube, said rotatable support means supporting said plates such that at least some of said diametrical axes are angularly offset relative to other of said diametrical axes such that said plates reflect the light in different lateral directions, said plates having an oval configuration with the largest dimension of the oval being greater than the inner diameter of said cylindrical tube.

2. A light transmitting device according to claim 1, wherein said oval plates are rotatable to a position in which said oval plates are disposed at an acute angle relative to the longitudinal axis of said cylindrical tube, said plates in said position having their outer edges juxtaposed to the inner cylindrical wall of said cylindrical tube so as to minimize the amount of light passing between said outer edges and said inner cylindrical wall.

3. A light transmitting device for radiating light transmitted thereto from a light source to the ambience comprising an elongate transparent cylindrical tube which is supplied with light at one longitudinal end thereof, said cylindrical tube having a longitudinal axis, a plurality of partially reflecting plates disposed within said cylindrical tube, rotatable support means on said cylindrical tube for rotatably supporting said plates about diametrical axes which are perpendicular to and which intersect the longitudinal axis of said cylindrical tube, said rotatable support means comprising an opening and a slot in said cylindrical tube, a support piece mounted on said cylindrical tube over said slot, said support piece having a passage diametrically aligned with said opening such that said opening and said passage rotatably support said plate, said slot being of a size to provide for insertion of said plate into said cylindrical tube prior to mounting of said support piece on said cylindrical tube, each of said plates being rotatable to positions such that the general plane of each plate is disposed at an acute angle relative to the longitudinal axis of said cylindrical tube such that each of said plates reflects a part of the light incident thereon laterally of the longitudinal axis of the cylindrical tube, said rotatable support means supporting said plates such that at least some of said diametrical axes are angularly offset relative to other of said diametrical axes such that said plates reflect the light in different lateral directions.

* * * * *